United States Patent [19]
Reese

[11] Patent Number: 5,183,074
[45] Date of Patent: Feb. 2, 1993

[54] PRESSURE-REDUCING VALVE, AND AIRCRAFT FUELING SYSTEM INCORPORATING THE SAME

[75] Inventor: James R. Reese, Vancouver, Wash.
[73] Assignee: Cla-Val Co., Costa Mesa, Calif.
[21] Appl. No.: 769,125
[22] Filed: Sep. 30, 1991
[51] Int. Cl.[5] .................. G05D 16/00; F16K 11/10
[52] U.S. Cl. ............... 137/488; 137/627.5; 137/596.18
[58] Field of Search ............. 137/488, 627.5, 596.18, 137/596.1

[56] References Cited
U.S. PATENT DOCUMENTS
4,609,008  9/1986  Anderson ................... 137/488
5,056,865  10/1991  Mooney ...................... 137/488 X Primary Examiner—Alan Cohan
Attorney, Agent, or Firm—Richard L. Gausewitz

[57] ABSTRACT

There is disclosed a pilot operated pressure-reducing valve system incorporating a main valve and a pilot valve, the latter being either near or remote from the main valve. The pilot and main valves cooperate with each other in such manner that the main valve will close very rapidly, this being important in aircraft fueling systems for example. Two related poppets are provided in the pilot valve, one such poppet being adapted to permit high flow for achievement of the substantially instantaneous main valve closure.

22 Claims, 6 Drawing Sheets

PRESSURE-REDUCING VALVE, AND AIRCRAFT FUELING SYSTEM INCORPORATING THE SAME

BACKGROUND OF THE INVENTION

Aircraft fueling systems at commercial and military airports often incorporate miles of underground pipe through which fuel is pumped at high flow rates to individual aircraft fueling (parking) stations. The flow rates to each fueling station are often in the hundreds of gallons per minute.

Valve systems are provided at the individual fueling stations to reduce to a predetermined level the pressure of the flowing fuel, and to rapidly stop fuel flow when the aircraft fuel tank (of a particular airplane being fueled) becomes full and the high-level shut-off valve in such tank closes. Because of the large mass of the rapidly flowing fuel in the long lengths of pipe, it is important that the valve at an aircraft fueling station close before final closure of the shut-off valve in the aircraft tank being filled; otherwise, pressure surges could occur that would pressurize an aircraft fuel manifold to an unsafe level.

It is important that the valve means at each aircraft fueling station be simple, rugged, effective and substantially foolproof. It must accurately control the pressure of the fuel in the line between the fueling station and the aircraft fuel tank, and it must substantially instantaneously (less than a second) shut off just before the aircraft tank valve fully closes.

The valve means should have only one adjustment to set, in order to regulate pressure, because when more than one adjustment must be set the maintenance personnel can become confused and make mistakes. The valve means must be characterized by high stability, automatic rapid shut off, low friction (minimum use of sliding O-rings), and an ability to be used in different modes such as (for example) being part of an automatic excess-flow shut off that operates when a line breaks between the fueling station and an aircraft.

For many years, the assignee of the present patent application has supplied, for use in aircraft fueling stations at civilian and military airports, a pilot-operated pressure-reducing valve system that utilizes a "flowing control system" to control the main diaphragm valve at each fueling station. At all times when the system is operating, there is flow across the main valve through a circuit including an orifice restriction and a pressure-reducing pilot. Continuous flow of the fuel is required through this "flowing control system" in order to continuously modulate the pressure in the cover chamber of the main valve. The indicated "flowing control system" can present problems relative to cost, complexity, setting, requirement for substantial amounts of pipe, etc.

Pilot-operated diaphragm (and piston) valve systems have long been known which are not continuous flow but which are not satisfactory for airport fueling-station and many other purposes. Such valve systems are often characterized by complexity, large numbers of parts, inability to effect extremely rapid closing of the main valve, the presence of excessive numbers of sliding O-rings that increase friction and reduce stability, etc. There is a major need for a truly simple and fully effective pilot valve that has only a single setting means, and that is not (except in certain instances where additional functions are performed) part of a "flowing control system".

SUMMARY OF THE INVENTION

The present valve and valve system comprise a pilot-controlled diaphragm valve, the system not being a "flowing control system". The pilot means is an extremely simple, sensitive and stable diaphragm valve having few parts and (in the best mode) only one or two sliding O-rings. The pilot valve causes closing of the main valve at a rate many times faster than the rate of opening of such valve. Thus, the pilot-operated diaphragm valve will shut in much less than a second when a signal is received indicating that the valve on an aircraft fuel tank is closing.

The pilot valve has a small-area normally-open poppet valve the stem of which is connected to a diaphragm for operation of such poppet valve to closed condition in response to an increase in the pressure on the downstream side of the main valve. When such poppet thus closes, outflow of fuel from the cover chamber of the main valve ceases, so that the diaphragm of the main valve does not move further in an opening direction. If the downstream pressure then increases further, within a pre-set range of (for example) 1-3 psi, there is no outflow or inflow of fuel relative to the cover chamber of the main valve so that the main valve diaphragm remains stationary, this being a stable operating range of pressure.

Should substantial further increase in the pressure on the downstream side of the main valve occur, the diaphragm of the pilot valve moves further in the same direction as before. The poppet of the small-area valve then lifts a second and much larger-area poppet off its seat, thus causing very rapid flow of fuel into the cover chamber of the main valve and consequent extremely fast closing of such main valve.

In summary, when the small-area poppet valve is open there is outflow of fuel from the cover chamber of the main valve, and when the large-area poppet is open there is rapid inflow of fuel into the cover chamber of the main valve. The outflow of fuel from such cover chamber, through the small-area poppet, is through the stem of the large-area poppet. The small poppet is normally open, while the large poppet is normally closed.

In the valve system at a fueling station in an airport, remote sensing means are provided to pressurize the underside of the diaphragm of the pilot valve when the pressure in the line between the main valve and the aircraft fuel tank starts to rise. It is this pressure on the underside of the pilot diaphragm that—when the pressurization is substantial—causes the normally-closed poppet to open and thus effect rapid shut off of the main valve.

BRIEF DESCRIPTION OF THE DRAWINGS

FIGS. 2 and 3 are fragmentary cross-sectional views on lines 2—2 and 3—3 of FIG. 1a;

DETAILED DESCRIPTION OF THE PREFERRED EMBODIMENTS

Figure 1:
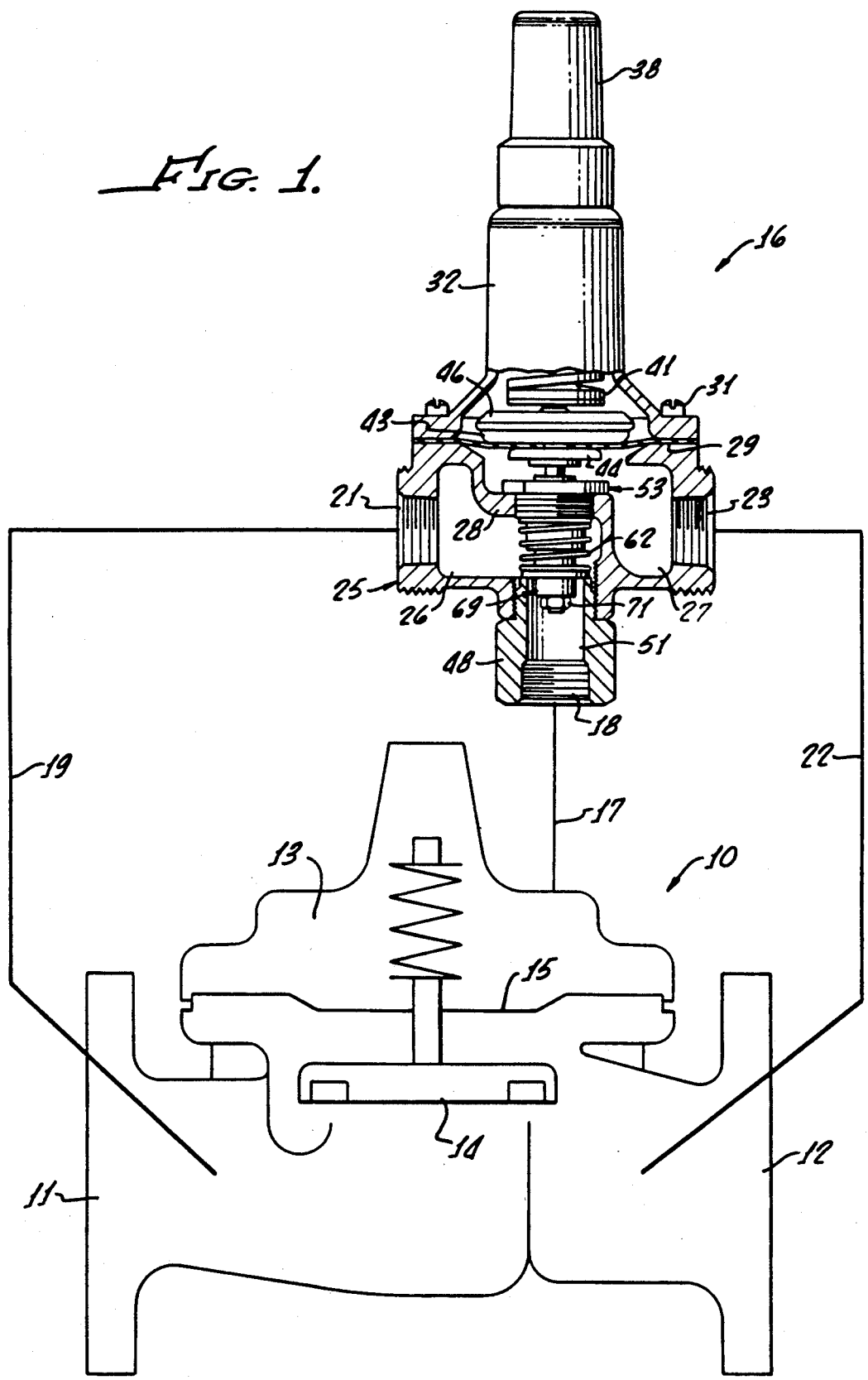
FIG. 1 is a view, partially in vertical section, showing the pilot valve as associated with the main valve, the latter being shown schematically.

Referring first to FIG. 1, there is shown schematically a main valve 10 having an inlet 11 and an outlet 12. The main valve 10 has a cover chamber 13 which is above a downwardly spring-pressed movable valve element, namely a poppet 14, and is operated by a diaphragm 15.

Main valve 10 (FIG. 1) is controlled by a pilot valve 16 that is preferably a diaphragm valve as illustrated. Pilot 16 may be mounted directly on the cover of main valve 10 so as to minimize piping and response time, or it may be connected to different portions of the main valve by pipes or tubes schematically represented in FIG. 1. These are: a tube 17 connecting a "cover" port 18 of the pilot valve to cover chamber 13 of the main valve; a tube 19 connecting the inlet port 21 of the pilot to inlet 11 of the main valve; and a tube 22 connecting the outlet port 23 of the pilot to outlet 12 of the main valve.

It is a feature of the present construction that many of the parts of pilot valve 16 can be and preferably are standard (sold for many years) in the product line of applicant's assignee. These include (for example) the pilot valve body 25 having the inlet port 21 and outlet port 23. These ports communicate, respectively, with inlet and outlet chambers 26,27 that are separated from each other by the bridge or internal wall 28 of the body 25. Also included are the diaphragm 29 that is mounted over chamber 27, being peripherally held down by screws 31 that extend through a flange portion of a vertically-elongate valve cover 32 (the chamber 33 in which is vented to atmosphere by a port 34, FIG. 1a). Threaded coaxially down through the upper end of cover 32 is a pressure-adjustment screw 36 having a lock nut 37 mounted thereon and being protected by a protective cover 38. Screw 36 is the only pressure adjustment means in the system.

Additional conventional elements in the pilot valve 16 include upper and lower flanged cups 39,40 between which is seated a helical compression spring 41. Cup 39 receives the pointed lower end of screw 36, it being understood that each cup 39,40 has a central apex portion that receives and centers a pointed (conical) element introduced therein.

Further conventional elements include a shallow cup-shaped upper diaphragm washer 43, a lower diaphragm washer 44, and a belleville spring 45 contained within upper washer 43 and diverging downwardly. The primary operative region of diaphragm 29 is sandwiched between washers 43 and 44, being held down by spring 41 that seats on lower cup 40.

Figure 5:
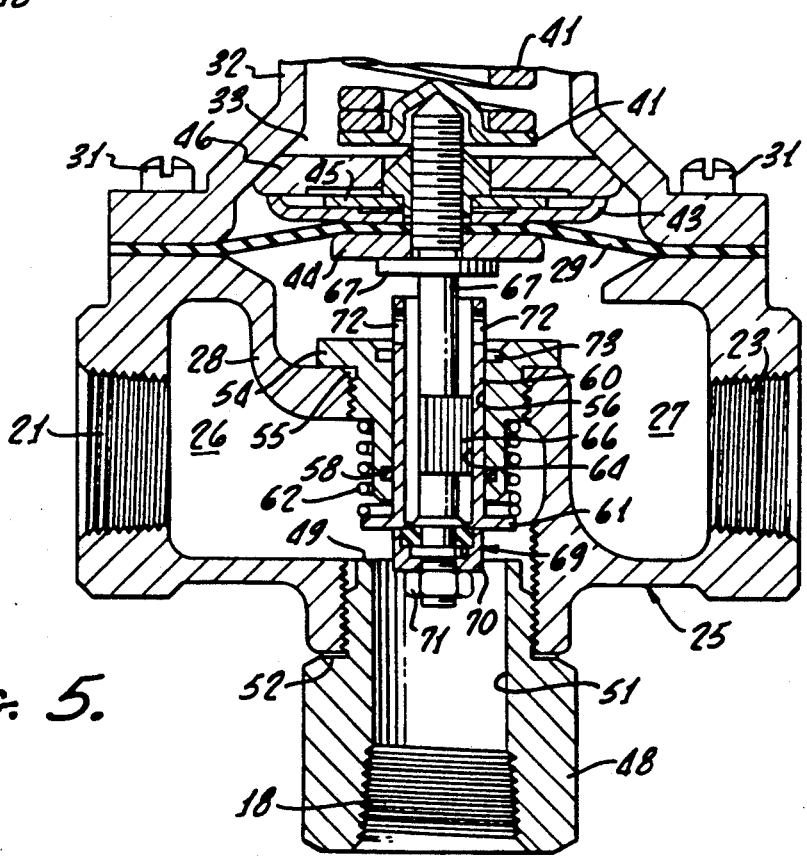
FIG. 5 is a view corresponding to FIG. 1a but showing the pilot valve in its condition that exists when the main valve is closing.

A synthetic resin stop disc or element 46 is disposed beneath cup 40. Disposed coaxially within the discshaped stop element 46 is a centering nut 47. The relationships are such that when the central region of diaphragm 29 moves to its uppermost position, as shown in FIG. 5, the upper peripheral portion of stop element 46 engages a conical region of valve cover 32 and thus prevents the valve parts (stem 65 and normally open valve parts 69 and 70) from being strained by the upward force of the diaphragm created by pressure within outlet chamber 27.

The High-flow Low-friction Normally-closed Poppet Valve for Admitting Fluid into Cover Chamber 13 of Main Valve 10.

Figure 1A:
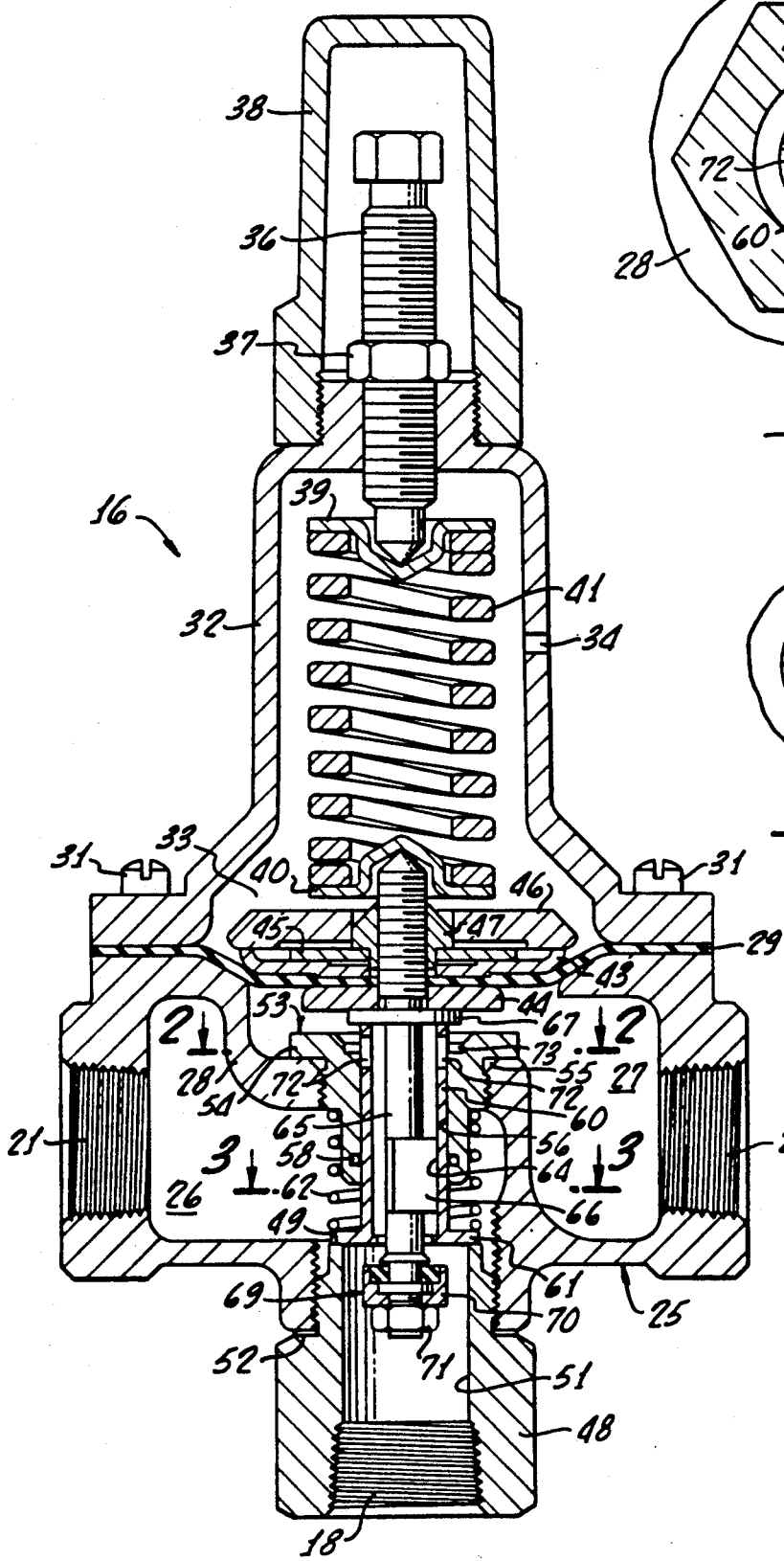
FIG. 1a is an enlarged vertical sectional view showing the pilot valve in it normal condition.

A large diameter hollow nut or fitting 48 is threaded into an annular boss at the bottom of pilot valve body 25, coaxially of diaphragm 29, cover 32, etc. Fitting 48, which defines at its lower portion the cover port 18, has a valve seat 49 at the upper end thereof. The valve seat 49 is substantially horizontal (when the pilot valve 16 is oriented as shown in FIG. 1a), and lies radially-outwardly of the upper end of a relatively large diameter cylindrical interior wall 51 of fitting 48. A gasket 52 is provided between the annular boss on valve body 25 and the large diameter hex-head of fitting 48.

The internal wall or bridge 28 is apertured and internally threaded at the region coaxial to nut 48 and diaphragm 29, etc. Threaded into the threaded aperture in bridge 28 is a valve guide 53, such guide having a hex-flange 54 at the upper end thereof and that seats on the upper surface of bridge 28. An O-ring 55 is provided beneath flange 54 in sealing relationship to a shoulder at the upper end of the threaded opening in the bridge.

Valve guide 53 has a cylindrical internal surface 56 the diameter of which is substantially smaller than that of surface 51, the surfaces 56 and 51 being coaxial of each other and of diaphragm 29, etc. At the lower end portion of valve guide 53 there is provided an annular groove that receives an O-ring 58.

The stem 60 of the large diameter normally-closed poppet valve is cylindrical and tubular, being telescoped in and a sliding fit relative to cylindrical surface 56 of valve guide 53. Thus, leakage between the stem and the valve guide is prevented by O-ring 58. At its lower end, stem 60 has a radial flange 61 which forms the head of the large diameter normally-closed poppet valve. The peripheral region of head 61 seats on the relatively large diameter valve seat 49.

Because of the large diameter of the valve seat, and of the wall 51 therebeneath, lifting of head 61 causes a high flow of fluid from inlet chamber 26 through the 360-degree opening above seat 49 and through the fitting 48 (including cover port 18) and tube 17 to the cover chamber 13 in main valve 10. Thus, elevation of poppet head 61 causes very rapid filling of the cover chamber 13 and consequent closing of main valve 10. As above indicated, this can occur in less than a second when the conditions warrant it.

A helical compression spring 62 is mounted around the lower portion of fitting 53, extending between a shoulder on the underside of such fitting and the upper side of poppet head 61. Spring 62 maintains the poppet head 61 closed at all times except when the poppet head 61 is actuated to open condition as described subsequently. Spring 62 is caused to have such a strength as to create a relatively small "dead band" of pressure, preferably in the range of 1-3 psi.

The Normally-open Small Diameter Poppet Valve

Figure 3:
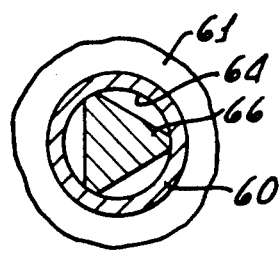

The interior surface 64 of stem or tube 60 is cylindrical and forms the valve guide for stem 65 of the small diameter normally-open poppet valve. As shown in FIG. 3, stem 65 has a triangular region 66 that slides on such surface 64 and keeps the stem 65 centered in and coaxial of the tubular stem 60 of the large poppet.

Stem 65 extends upwardly through a central aperture in diaphragm 29, through central apertures in washers 43,44 and spring 45, and through the centering nut 47—being threaded into such nut. The upper end of stem 65 is conical and seats in a central recess in lower cup 40 for spring 41. A flange 67 is provided on stem 65 beneath lower diaphragm washer 44 and bears against such washer. The underside of flange 67 seats on the upper end of tubular stem 60 when, but only when, the parts are in the "normal" positions of FIG. 1a.

A poppet head 69 is provided at the lower end of stem 65, in such relationship as to be spaced below large poppet head 61 when the latter is in seated condition and the diaphragm 29 is in its lower position as shown in FIG. 1a. Poppet head 69 comprises an O-ring that is mounted between protuberant annular portions formed on stem 65, which O-ring is seated in a cup 70 that is mounted coaxially on the lower stem end. Cup 70 has a central bottom opening through which a threaded region of stem 65 extends, and on which is threaded a nut 71 that holds the cup in position.

The relationships are such that when stem 65 is shifted upwardly relative to the head 61 of the large poppet, the O-ring that (along with cup 70) forms the head 69 of the small poppet, seats on large poppet head 61 to prevent flow of fluid through stem 60 of the large poppet.

Figure 2:
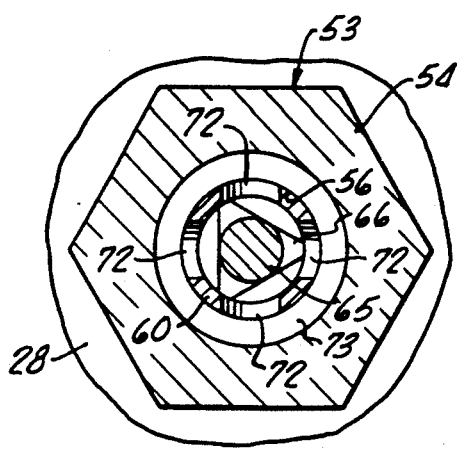

The upper end of tube or stem 60 of the large poppet is radially apertured, preferably having four circumferentially-spaced ports 72 as shown in FIG. 2. The ports 72 communicate with a generally cup-shaped region 73 at the upper end of valve guide 53.

When the small poppet is in the open condition shown in FIG. 1, fluid can flow from cover chamber 13 of main valve 10 through tube 17 and cover port 18 to the interior of tube or stem 60, and thence through ports 72 into outlet chamber 27 of the pilot valve. From there it flows through port 23 and tube 22 to the downstream side of main valve 10, as shown in FIG. 1.

The region of large poppet head 61 surrounding stem 65 is somewhat necked down, as shown. Accordingly, the flow annulus between stem 65 and the necked-down region is quite small. It is only a small fraction of the flow annulus that is created between seat 49 of the large poppet and the head 61 thereof when the large poppet is lifted substantially.

Operation of the Apparatus As Thus Far Described

When the pilot valve 16 is in the normal or "at rest" position shown in FIG. 1a, the force of spring 41 acts through the various intermediate members 40,65 and 47 to press flange 67 down, thus holding small valve head 69 down—away from element 61 (the head of the large diameter poppet) which is the seat for the small valve. Large poppet head 61 is held down on its seat 49 by spring 62.

Thus, with the small diameter valve open, pressure from cover chamber 13 of main valve 10 flows through the opening 18 and through tube or stem 60 and ports 72 to chamber 27, port 23 and to the outlet or downstream side of main valve 10. The pressure in cover chamber 13 of main valve 10 thus being relieved, the main valve 10 is allowed to open in response to fluid pressure acting on poppet 14.

Opening of main valve 10 causes pressure to be built up on the outlet side thereof, and this pressure is reflected back through port 23 of pilot valve 16 to the underside of diaphragm 29. When such force becomes sufficiently large to overcome the force of spring 41, diaphragm 29 is lifted and causes head 69 of the small poppet to seat on head 61 of the large poppet. Such seating of head 69 on head 61 prevents further outflow of fluid from cover chamber 13 of valve 10.

Figure 4:
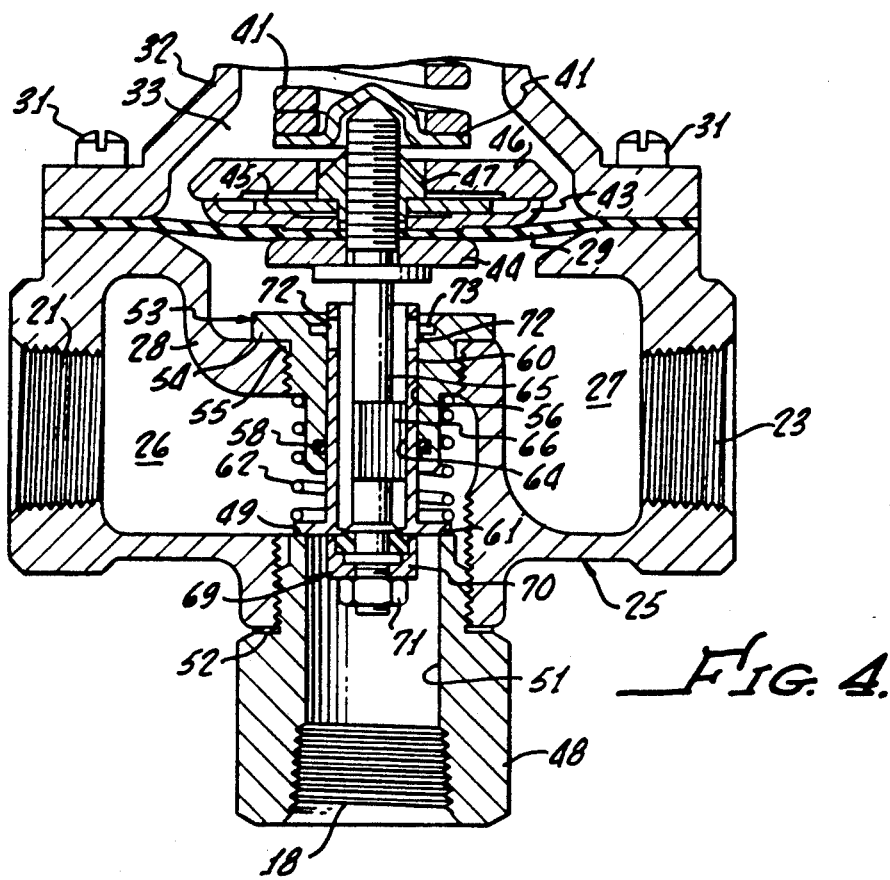
FIG. 4 is a view corresponding to FIG. 1a but showing the pilot valve in its position that exists when the main valve is neither opening nor closing.

The parts are then in the position of FIG. 4, both poppet valves being in closed condition. Further buildup of pressure in chamber 27 on the underside of diaphragm 29 does not immediately cause the large poppet to open, because spring 62 prevents this result over a predetermined pressure range such as the above-indicated 1-3 psi. This dead band range increases the stability of the system and prevents constant movement of the main valve under typical conditions in most fluid systems.

Stated otherwise, when the outlet pressure of main valve 10 is equal to the setting of the pilot valve 16, then both the normally-open and normally-closed poppet valves will be closed as shown in FIG. 4, and the position of main valve 10 will remain constant because fluid can neither enter nor leave its cover chamber 13. This condition continues until there is a change in pressure sufficient to cause opening of either the small normally-open valve or the large normally-closed valve.

When the pressure at the outlet side of the main valve 10 rises to a value above the setting of spring 41, which setting is determined by the pressure adjusting screw 36 (FIG. 1a), diaphragm 29 moves upwardly to a position above that shown in FIG. 4. If the pressure rise at the outlet side of the main valve is sufficiently large, diaphragm 29 moves upwardly until stop element 46 engages cover 32 of the pilot valve as shown in FIG. 5. However, under normal line pressure fluxuations, the normally-closed valve will only open far enough to bring the downstream pressure back to the set point. As illustrated in FIG. 5, the small diameter poppet 69 has engaged and pulled the large diameter poppet 61 off its seat 49 to the wide open position of FIG. 5. Inlet fluid from chamber 26 of poppet valve 16 then flows at high volume through the large poppet and out port 18 to cover chamber 13 of main valve 10, closing the latter very rapidly.

It is emphasized that fluid from inlet chamber 26 of the pilot valve cannot flow through stem 60 of the large poppet, but must instead flow out through port 18 to the main cover chamber 13. This is because flow through stem 60 is blocked as the result of closure of the small poppet.

Total or partial closure of main valve 10 causes pressure on the downstream side thereof to reduce, which reduced pressure is reflected back through tube 22 and port 23 to the underside of diaphragm 29, thus permitting spring 41 to force diaphragm 29 downwardly. Such downward movement first causes the poppet valves to enter the described dead band range and then causes the head 69 of the small poppet to move downwardly away from large poppet head 61. The parts are then back in the position of FIG. 1, with fluid being released from the main cover chamber 13 and passed through the small poppet and the ports 72 to port 23 and the outlet side of the main valve.

It is emphasized that only a single setting of the present valve system is required, namely that of the screw 36 which determines the outlet pressure of the main valve. It is also emphasized that, in the present valve system, there is no need for a separate element or control in order to cause the main valve to close rapidly when there is a pressure surge downstream therefrom;

this is effected automatically in the present valve system as described subsequently.

It is also pointed out that, in the present valve and system, the speed of main valve closure is dependent on the amount of over pressure in the system on the downstream side of the main valve. If the system pressure on the downstream side is only 1 or 2 psi above the set upper end of the dead band range determined by spring 62, then the normally-closed poppet 61 only opens a small amount which causes a relatively slow closure of the main valve. However, if the system pressure on the downstream side of the main valve rises 5 or 6 psi above the upper end of the dead band range, then the large poppet 61 will rise further, which will effect a closing motion of the main valve more quickly. If there is a large pressure surge downstream from the main valve, the large poppet substantially instantaneously opens to the full open position of FIG. 5, and the main valve is very rapidly shifted to fully closed position.

The flow area of said poppet is at least several times that of the small poppet. Preferably, the large-poppet flow area is at least five times the flow area of the small poppet (the flow area being determined when each poppet is in full open position).

The Fueling System for Aircraft

Figure 6:
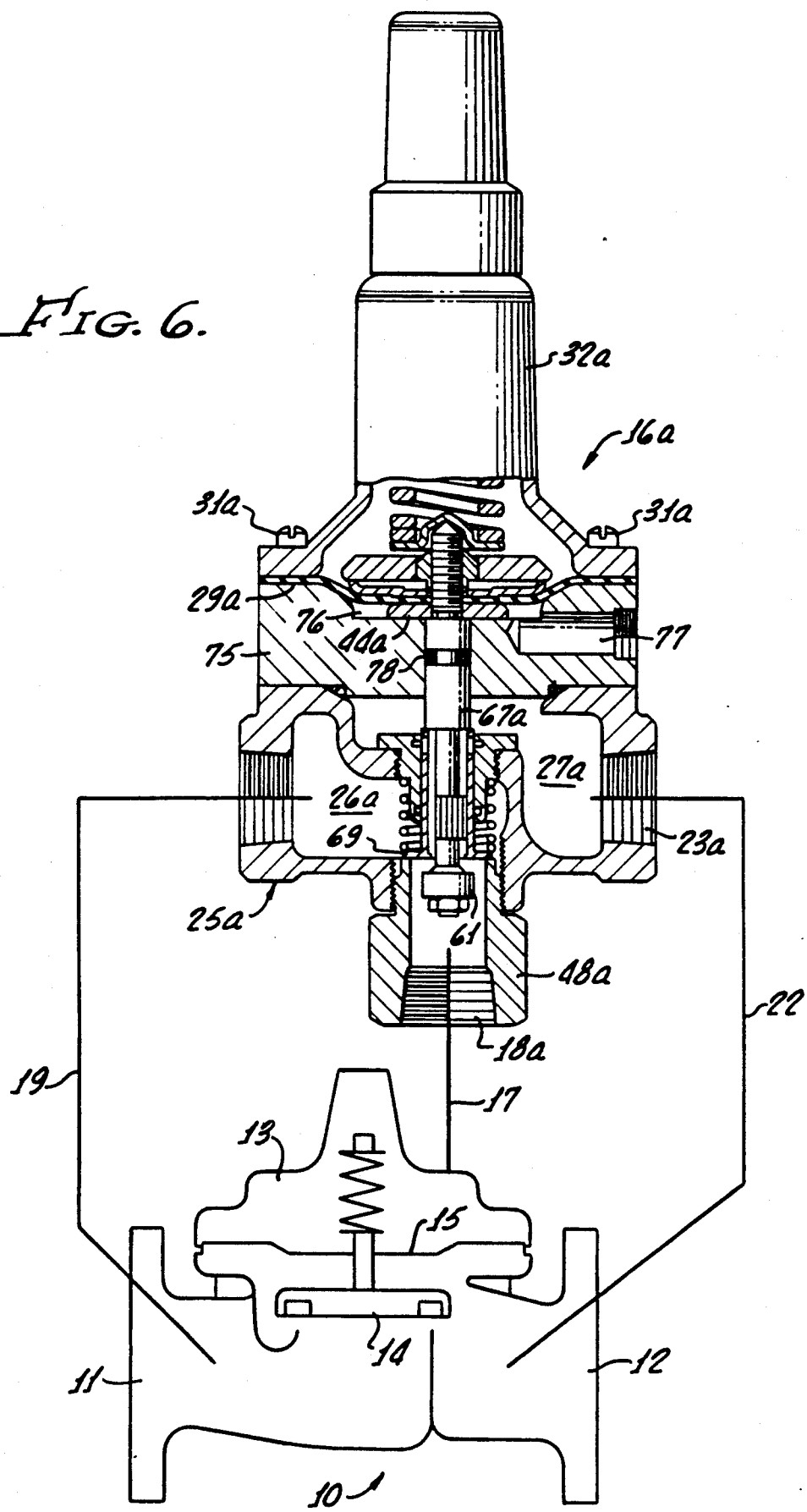
FIG. 6 is a view of the pilot employed when there is remote sensing of pressure.
Figure 7:
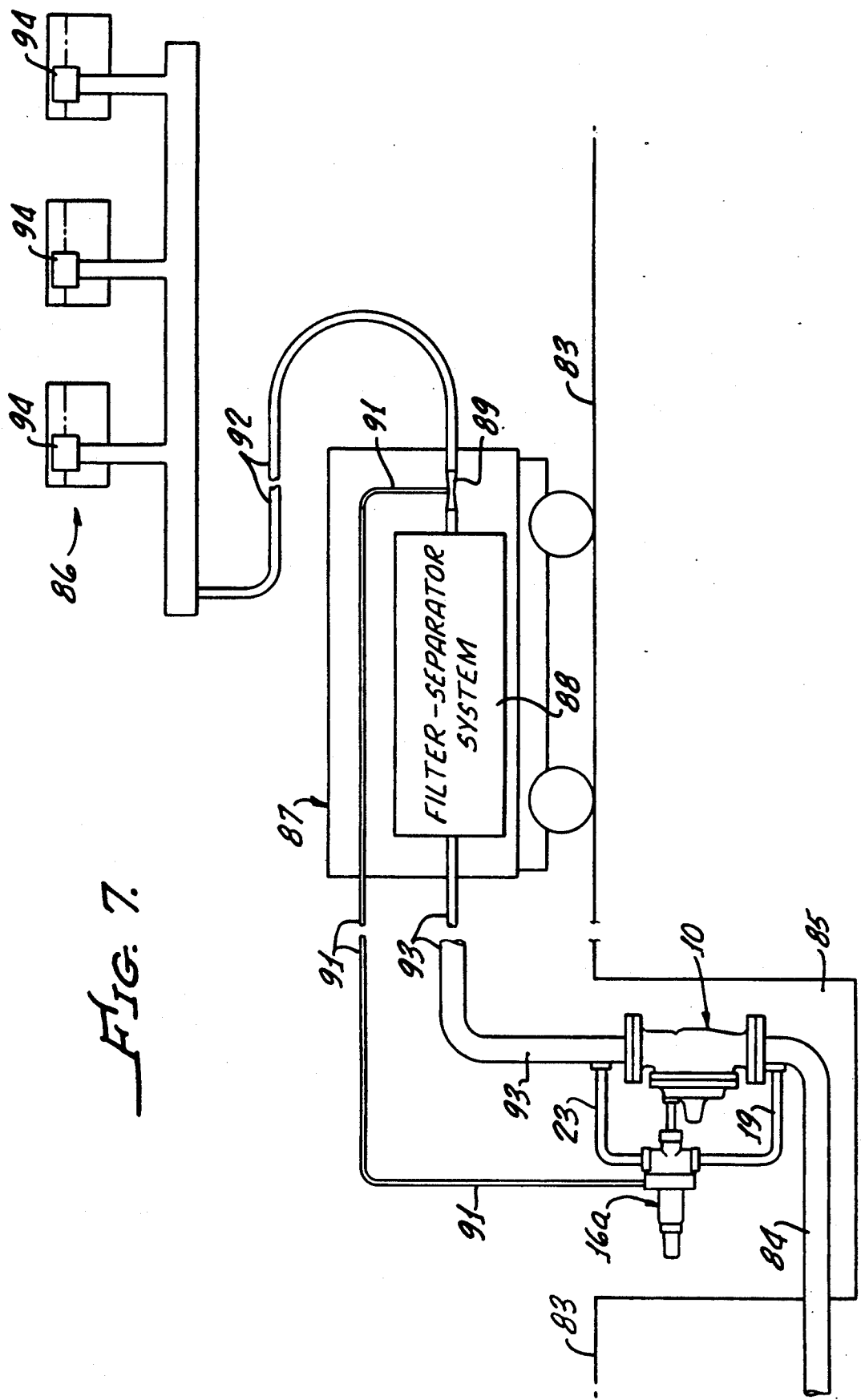
FIG. 7 is a schematic representation of main components at an aircraft fueling station, one such component being the valve of FIG. 6.

FIG. 6 shows a remote sensing pilot-operated valve. FIG. 7 shows part of a fueling system at an airport. Such a system incorporates at least one of the present pilot-operated valves at each fueling (parking) station.

In the pilot valve of FIG. 6, the reference numbers of the same parts are the same as in previous figures except followed by the letter "a".

Referring to FIG. 6, the main valve 10 is again schematically represented, being typically a large diaphragm valve as stated at the beginning of this specification. It is controlled by a pilot valve 16a that is identical to the above-described pilot valve 16 except as stated. In valve 16a, the diaphragm 29a is isolated from discharge chamber 27a of the valve. This is done by lifting the valve cover 32a and placing between it and valve body 25a a disc (power unit body) 75 having a chamber 76 therein that communicates with a radial port or passage 77.

The screws 31a are made longer to compensate for the thickness of disc 75, and flange 67 is vertically much thickened so as to form an elongate cylinder 67a that extends slidably through a vertical cylindrical passage in disc 75. An O-ring 78 is provided in such element 67a to seal outlet chamber 27a from diaphragm chamber 76. The lower diaphragm washer 44a seats on the upper end of element 67a.

With the described construction, diaphragm 29a is operated by pressure transmitted through port or passage 77, there being little or no flow through such port or passage 77. On the other hand, there is flow through the tubes 17,19 and 22 connecting the pilot valve to the main valve, as in the previously described system.

Referring next to FIG. 7, the surface of the parking station is indicated by the reference numeral 83. Beneath the surface 83 lie long lengths of underground pipe 84 (a small part of which is indicated at the left in FIG. 7). Such pipe extends to pits at various fueling stations, one of which pits (with the cover removed) is shown at 85.

The main valve 10 is disposed in pit 85, normally with its axis vertical, and is associated with the pilot valve 16a as described relative to the showing of FIG. 6. It is to be understood that the pit may contain various other elements such as (for example) a backup valve system, etc.

A truck or cart-mounted fueling means is provided on wheels and driven to a region adjacent the airplane to be fueled. Some of the fuel tanks in the airplane are indicated schematically at 86, while the fueling truck is indicated schematically at 87.

Truck 87 contains numerous unshown elements, such as a meter, etc., and also contains a filter-separator system 88 for separating water from fuel passing into the fuel tanks. A sensor 89 is provided and is shown as being a venturi the throat of which connects through a tube 91 to the port or passage 77 in pilot 16a (FIG. 6).

During fueling, a flexible hose 92 is suitably connected between truck 87 and a manifold leading to the fuel tanks 86. A second flexible hose is suitably connected between the truck and the outlet side of main valve 10 as represented at 93.

In a typical large airplane, there is a high-level shut-off valve that closes when each tank becomes substantially full. These are each represented at 94.

In the operation of the system represented in FIG. 7, fueling of an airplane parked relatively near the pit 85 is effected by driving the truck 87 to a region near the airplane wing, removing the cover (not shown) from the top of pit 85, connecting the sensing tube 91 to pilot valve 16a, connecting the hose 92 from truck 87 to the fuel tanks 86, and connecting the hose 93 from truck 87 to the outlet of main valve 10.

Flow of fuel to tanks 86 is then commenced, typically by using a suitable "dead man" system (not shown) which requires that the operator squeeze an element at all times during fueling. The fuel flows rapidly through the underground pipe 84, often from a very remote pumping station. Since the fuel flows at a high rate in many instances, for example eight hundred gallons per minute, a large amount of momentum is built up in the fuel in pipe 84. If the last-to-close of the high-level shut-off valves 94 on the airplane were to close, without prior closure of valve 10, the associated fuel tank would receive a large surge of pressure which would typically damage that tank or the aircraft.

When initial (incomplete) closing of the last-to-close valve 94 occurs, pressure builds up in hose 92 near the aircraft. This reduces the flow through the hose 92 and through the venturi 89. Accordingly, the pressure in sensing tube 91 increases—either slowly or rapidly depending upon the rate of change of flow in hose 92. The increased pressure in tube 91 operates through port or passage 77 to lift the diaphragm 29a (FIG. 6) which, as described in detail above, elevates the large diameter poppet head 61 to cause introduction of fuel from pipe 84 into cover chamber 13 of main valve 10.

Multi-Function Operation with Excess-Flow Shut Off

Figure 8:
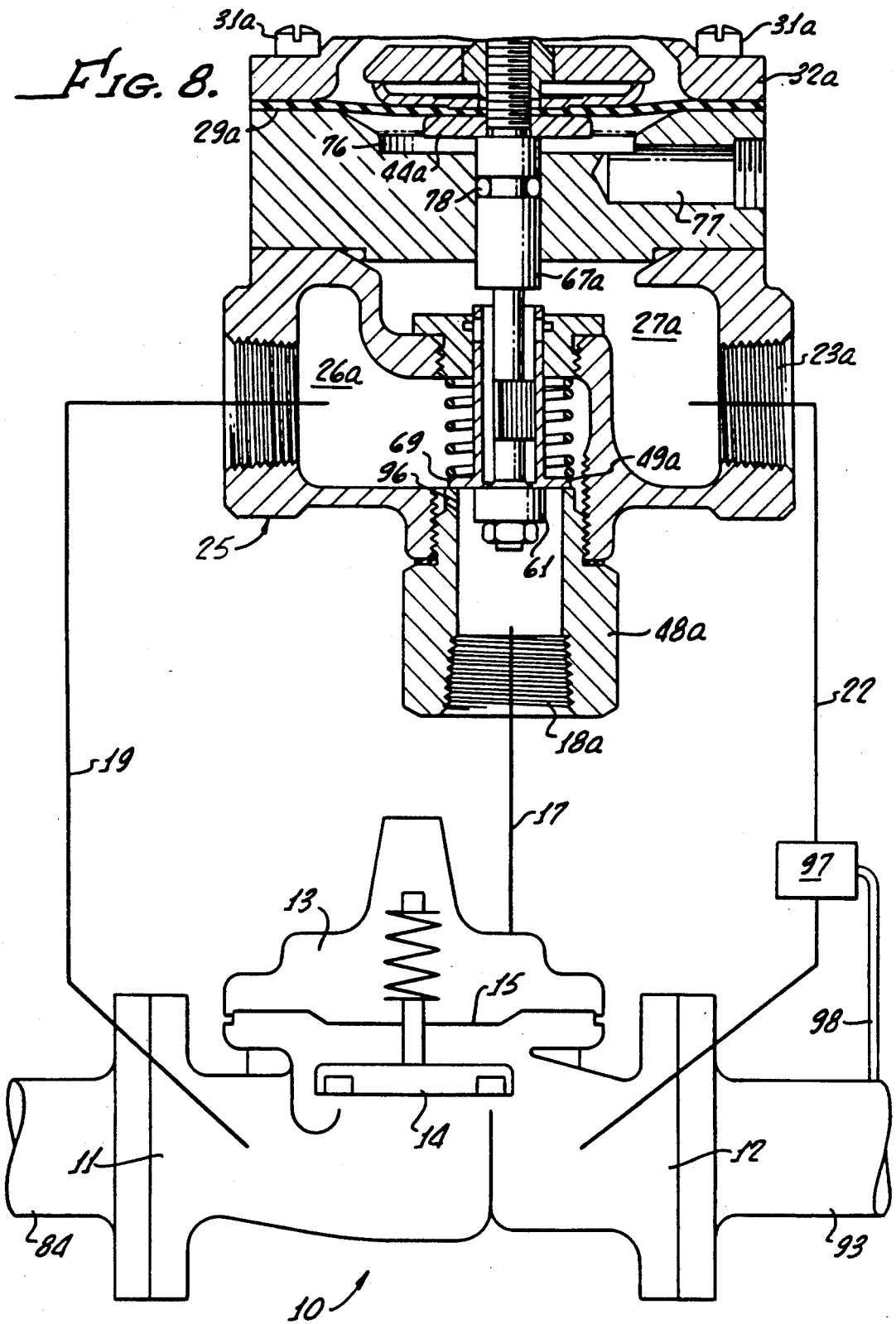
FIG. 8 is a view showing the present valve in a system that also incorporates an excess-flow shut off.

Referring next to FIG. 8, there is incorporated into the valve system of FIG. 7 (for example) an excess-flow shut off that causes valve 10 to close in the event a pipe or hose downstream therefrom becomes accidentally broken or disconnected. This prevents major spillage of jet fuel or other liquid, or escape of gas (it being understood that the present valve system can operate with a gas as well as a liquid).

A small diameter orifice 96 is provided in generally laterally-extending relationship in the region of fitting 48a just below valve seat 49a. This effects a constant low flow of fluid from inlet chamber 26a through the orifice 96 and thence through port 18a toward the cover chamber 13 of main valve 10. As the pressure in the cover chamber 13 starts to build up, the main valve starts to close. This causes the downstream pressure to drop, which lowers the pressure under diaphragm 29a, thereby opening the normally-open valve (which at that time is closed as stated below) and allowing more fluid to be released from the cover chamber 13 through the normally-open valve than is flowing into the cover chamber 13 through the small diameter orifice 96.

Flow through orifice 96 is very small in comparison to what occurs when the large diameter poppet is open as shown in FIG. 5, but is nevertheless sufficient to cause the main valve 10 to close in a reasonable time period and thus prevent excessive spillage.

When a pipe or hose breaks at a point downstream from valve 10, the pressure on the outlet side of such valve immediately greatly reduces. This causes the present system to attempt to open the main valve 10 as much as possible, thus causing a flow rate in excess of the desired amount. In other words, diaphragm 29a of the pilot valve immediately moves downwardly to its lowermost position as shown in FIG. 1a.

In order to cause the liquid from inlet chamber 26a and passing through orifice 96 to enter the main cover chamber 13 and close main valve 10, instead of passing through the small poppet and port 23a to the outlet side of the main valve, an auxiliary valve element 97 is provided in the tube 22 that extends from port 23a to the outlet side of the main valve. Valve 97 is a hydraulically operated valve that is actuated by a differential pilot (not shown). Such pilot senses the differential pressure across an orifice plate in line 93. As the flow rate through the orifice plate increases, the differential pressure across the orifice plate increases, and when the differential pressure across the orifice plate reaches a set amount, the differential pilot trips and permanently (until manual resetting) closes the auxiliary valve 97. A tube 98 transmits pressure between elements 97 and 93.

The differential (excess flow) pilot causes valve 97 to remain open at all times except when a pipe or conduit downstream therefrom becomes broken or disconnected. Upon breakage or disconnection, valve 97 closes and remains closed, so that fluid from inlet chamber 26a flows through orifice 96 into the main cover chamber 13 to close main valve 10 as desired.

The preferred main valve 10 is one sold under the trademark "Hytrol" by Cla-Val Co. of Costa Mesa, Calif.

It is to be understood that the diaphragm in the pilot and/or the main valve may be replaced by a piston, and still be within the appended claims; but that is not the best mode.

The disc (power unit body) 75 shown in FIG. 6 can be considered part of the pilot valve body, in the appended claims.

The foregoing detailed description is to be clearly understood as given by way of illustration and example only, the spirit and scope of this invention being limited solely by the appended claims.

What is claimed is:

1. A pilot-operated pressure-reducing valve system, which comprises:
   (a) a main valve having an inlet side, an outlet side, and means comprising a main-valve diaphragm and cover chamber to create a controlled reduced pressure of the fluid flowing out of said outlet side,
   (b) a pilot valve body, said body having an inlet chamber and an outlet chamber separated from each other by wall means having an opening therein,
   (c) a pilot diaphragm mounted on said pilot valve body,
   (d) pressure regulating spring means to bias said pilot diaphragm toward said opening,
   (e) means to adjust the force of said spring means to vary said reduced pressure,
   (f) means to connect said inlet chamber to said inlet side of said main valve,
   (g) means to connect said outlet chamber to said outlet side of said main valve,
   (h) conduit means to connect said inlet chamber to said cover chamber in said main valve, said conduit means having a relatively large flow area so as to be able to conduct fluid at relatively high flow rates from said inlet chamber to said main-valve cover chamber,
   (i) a first valve mounted in said pilot valve body to control the flow of fluid from said inlet chamber through said conduit means to said main-valve cover chamber, said first valve having a relatively large flow area so as to cooperate with said conduit means in effecting a relatively high flow of fluid from said inlet chamber to said main-valve cover chamber,
   (j) a second valve mounted in said pilot valve body to control the flow of fluid from said main-valve cover chamber through said conduit means, and through said opening in said wall means, to said outlet chamber, said second valve being capable of moving independently of said first valve, and
   (k) means to effect operation of said first valve and said second valve by said pilot diaphragm, in such manner that when said pilot diaphragm is in a position relatively adjacent said opening said first valve is closed and said second valve is open whereby fluid flows out of said main-valve cover chamber to permit the upstream pressure at said inlet side to effect partial or complete opening of said main valve, and also in such manner that when said pilot diaphragm is in a position relatively remote from said opening said first valve is open and said second valve is closed whereby fluid from said inlet chamber passes through said conduit means to said main valve cover chamber at a rate that can be high so as to effect fast closing of said main valve,
   said pilot diaphragm on the side thereof relatively adjacent said opening in said wall means being exposed to a control pressure related to that of fluid that has passed through said main valve.

2. A pilot-operated pressure-reducing valve system, which comprises:
   (a) a main valve having an inlet side, an outlet side, and means comprising a main-valve diaphragm and cover chamber to create a controlled reduced pressure of the fluid flowing out of said outlet side,
   (b) a pilot valve body,
       said body having an inlet chamber and an outlet chamber separated from each other by wall means having an opening therein,
   (c) a pilot diaphragm mounted on said pilot valve body,
   (d) pressure regulating spring means to bias said pilot diaphragm toward said opening, (e) means to adjust the force of said spring means to vary said reduced pressure, (f) means to connect said inlet chamber to said inlet side of said main valve, (g) means to connect said outlet chamber to said outlet side of said main valve, (h) conduit means to connect said inlet chamber to said cover chamber in said main valve, said conduit means having a relatively large flow area so as to be able to conduct fluid at relatively high flow rates from said inlet chamber to said main-valve cover chamber, (i) a first valve mounted in said pilot valve body to control the flow of fluid from said inlet chamber through said conduit means to said main-valve cover chamber, said first valve having a relatively large flow area so as to cooperate with said conduit means in effecting a relatively high flow of fluid from said inlet chamber to said main-valve cover chamber, (j) a second valve mounted in said pilot valve body to control the flow of fluid from said main-valve cover chamber through said conduit means, and through said opening in said wall means, to said outlet chamber, said flow area of said first valve, when said first valve is in fully open position corresponding to a high pressure on the side of said pilot diaphragm relatively adjacent said opening in said wall means, being greatly larger than the flow area of the smaller of the following: (a) the flow area of said second valve when it is in fully open position corresponding to a low pressure on the side of said pilot diaphragm relatively adjacent said opening, and (b) the smallest flow area along the flow path in said pilot valve that is in circuit with said second valve, and (k) means to effect operation of said first valve and said second valve by said pilot diaphragm, in such manner that when said pilot diaphragm is in a position relatively adjacent said opening said first valve is closed and said second valve is open whereby fluid flows out of said main-valve cover chamber to permit the upstream pressure at said inlet side to effect partial or complete opening of said main valve, and also in such manner that when said pilot diaphragm is in a position relatively remote from said opening said first valve is open and said second valve is closed whereby fluid from said inlet chamber passes through said conduit means to said main valve cover chamber at a rate that can be high so as to effect fast closing of said main valve, said pilot diaphragm on the side thereof relatively adjacent said opening in said wall means being exposed to a control pressure related to that of fluid that has passed through said main valve.

3. The invention as claimed in claim 1, in which both said first valve and said second valve are poppet valves.

4. The invention as claimed in claim 3, in which at least one of said poppet valves substantially completely seals shut when in closed condition.

5. A pilot-operated pressure-reducing valve system, which comprises:

(a) a main valve having an inlet side, an outlet side, and means comprising a main-valve diaphragm and cover chamber to create a controlled reduced pressure of the fluid flowing out of said outlet side, (b) a pilot valve body, said body having an inlet chamber and an outlet chamber separated from each other by wall means having an opening therein, (c) a pilot diaphragm mounted on said pilot valve body, (d) pressure regulating spring means to bias said pilot diaphragm toward said opening, (e) means to adjust the force of said spring means to vary said reduced pressure, (f) means to connect said inlet chamber to said inlet side of said main valve, (g) means to connect said outlet chamber to said outlet side of said main valve, (h) conduit means to connect said inlet chamber to said cover chamber in said main valve, said conduit means having a relatively large flow area so as to be able to conduct fluid at relatively high flow rates from said inlet chamber to said main-valve cover chamber, (i) a first valve mounted in said pilot valve body to control the flow of fluid from said inlet chamber through said conduit means to said main-valve cover chamber, said first valve having a relatively large flow area so as to cooperate with said conduit means in effecting a relatively high flow of fluid from said inlet chamber to said main-valve cover chamber, (j) a second valve mounted in said pilot valve body to control the flow of fluid from said main-valve cover chamber through said conduit means, and through said opening in said wall means, to said outlet chamber, both said first valve and said second valve being poppet valves, and (k) means to effect operation of said first valve and said second valve by said pilot diaphragm, in such manner that when said pilot diaphragm is in a position relatively adjacent said opening said first valve is closed and said second valve is open whereby fluid flows out of said main-valve cover chamber to permit the upstream pressure at said inlet side to effect partial or complete opening of said main valve, and also in such manner that when said pilot diaphragm is in a position relatively remote from said opening said first valve is open and said second valve is closed whereby fluid from said inlet chamber passes through said conduit means to said main-valve cover chamber at a rate that can be high so as to effect fast closing of said main valve, said pilot diaphragm on the side thereof relatively adjacent said opening in said wall means being exposed to a control pressure related to that of fluid that has passed through said main valve, the poppet of said first poppet valve having a hollow stem, the poppet of said second poppet valve having a stem that passes through said hollow stem and is connected to said pilot diaphragm for pulling thereby, said stem of said second poppet forming part of said means to effect operation of said first valve and said second valve by said pilot diaphragm.

6. The invention as claimed in claim 1, in which said pilot diaphragm is exposed to said control pressure by being exposed to said outlet chamber.

7. The invention as claimed in claim 1, in which said pilot valve body includes means to isolate said pilot diaphragm from said outlet chamber, and in which sensing means, including a conduit connecting to the side of said pilot diaphragm relatively adjacent said opening and also connected to a flow region of the fluid downstream from and remote from said main valve, are provided to supply control pressure to said pilot diaphragm.

8. A pilot-operated pressure-reducing valve system, which comprises:
(a) a main valve having an inlet side, an outlet side, and means comprising a main-valve diaphragm and cover chamber to create a controlled reduced pressure of the fluid flowing out of said outlet side,
(b) a pilot valve body,
said body having an inlet chamber and an outlet chamber separated from each other by wall means having an opening therein,
(c) a pilot diaphragm mounted on said pilot valve body,
(d) pressure regulating spring means to bias said pilot diaphragm toward said opening,
(e) means to adjust the force of said spring means to vary said reduced pressure,
(f) means to connect said inlet chamber to said inlet side of said main valve,
(g) means to connect said outlet chamber to said outlet side of said main valve,
(h) conduit means to connect said inlet chamber to said cover chamber in said main valve,
said conduit means having a relatively large flow area so as to be able to conduct fluid at relatively high flow rates from said inlet chamber to said main-valve cover chamber,
(i) a first valve mounted in said pilot valve body to control the flow of fluid from said inlet chamber through said conduit means to said main-valve cover chamber,
said first valve having a relatively large flow area so as to cooperate with said conduit means in effecting a relatively high flow of fluid from said inlet chamber to said main-valve cover chamber,
(j) a second valve mounted in said pilot valve body to control the flow of fluid from said main-valve cover chamber through said conduit means, and through said opening in said wall means, to said outlet chamber, and
(k) means to effect operation of said first valve and said second valve by said pilot diaphragm, in such manner that when said pilot diaphragm is in a position relatively adjacent said opening said first valve is closed and said second valve is open whereby fluid flows out of said main-valve cover chamber to permit the upstream pressure at said inlet side to effect partial or complete opening of said main valve, and also in such manner that when said pilot diaphragm is in a position relatively remote from said opening said first valve is open and said second valve is closed whereby fluid from said inlet chamber passes through said conduit means to said main valve cover chamber at a rate that can be high so as to effect fast closing of said main valve,
said pilot diaphragm on the side thereof relatively adjacent said opening in said wall means being exposed to a control pressure related to that of fluid that has passed through said main valve,
said pilot diaphragm having an intermediate position at which both said first valve and said second valve are closed, whereby fluid neither enters nor discharges from said main-valve cover chamber.

9. The invention as claimed in claim 8, in which spring means are provided to provide a predetermined small range of the pressures acting on said pilot diaphragm at which both said first and said second valves stay in closed conditions.

10. A pilot-operated pressure-reducing valve system, which comprises:
(a) a main valve having an inlet side, an outlet side, and means comprising a main-valve diaphragm and cover chamber to create a controlled reduced pressure of the fluid flowing out of said outlet side,
(b) a pilot valve body,
said body having an inlet chamber and an outlet chamber separated rom each other by wall means having an opening therein,
(c) a pilot diaphragm mounted on said pilot valve body,
(d) pressure regulating spring means to bias said pilot diaphragm toward said opening,
(e) means to adjust the force of said spring means to vary said reduced pressure,
(f) means to connect said inlet chamber to said inlet side of said main valve,
(g) means to connect said outlet chamber to said outlet side of said main valve,
(h) conduit means to connect said inlet chamber to said cover chamber in said main valve,
said conduit means having a relatively large flow are so as to be able to conduct fluid at relatively high flow rates from said inlet chamber to said main-valve cover chamber,
(i) a first valve mounted in said pilot valve body to control the flow of fluid from said inlet chamber through said conduit means to said main-valve cover chamber,
said first valve having a relatively large flow area so as to cooperate with said conduit means in effecting a relatively high flow of fluid from said inlet chamber to said main-valve cover chamber,
(j) a second valve mounted in said pilot valve body to control the flow of fluid from said main-valve cover chamber through said conduit means, and through said opening in said wall means, to said outlet chamber,
both said first valve and said valve being poppet valves, and
(k) means to effect operation of said first valve and said second valve by said pilot diaphragm, in such manner that when said pilot diaphragm is in a position relatively adjacent said opening said first valve is closed and said second valve is open whereby fluid flows out of said main-valve cover chamber to permit the upstream pressure at said inlet side to effect partial or complete opening of said main valve, and also in such manner that when said pilot diaphragm is in a position relatively remote from said opening said first valve is open and said second valve is closed whereby fluid from said inlet chamber passes through said conduit means to said main valve cover chamber at a rate that can be high so as to effect fast closing of said main valve,
said pilot diaphragm on the side thereof relatively adjacent said opening in said wall means being exposed to a control pressure related to that of fluid that has passed through said main valve,
the head of the poppet of said second poppet valve seating on the head of the poppet of said first poppet valve, said head of said poppet of said first poppet valve having a flow passage therethrough that is closed when said head of said poppet of said second poppet valve thus seats, said seating shutting off the flow path from said main-valve cover chamber to said outlet chamber.

11. The invention as claimed in claim 10, and in which the stem of the poppet of said second poppet valve extends longitudinally through the stem of the poppet of said first poppet valve to said pilot diaphragm.

12. The invention as claimed in claim 3, in which said first poppet valve is normally closed and said second poppet valve is normally open.

13. A pilot-operated pressure-reducing valve system, which comprises:
   (a) a main valve having an inlet side, an outlet side, and means comprising a main-valve diaphragm and cover chamber to create a controlled reduced pressure of the fluid flowing out of said outlet side,
   (b) a pilot valve body,
      said body having an inlet chamber and an outlet chamber separated from each other by wall means having an opening therein,
   (c) a pilot diaphragm mounted on said pilot valve body,
   (d) pressure regulating spring means to bias said pilot diaphragm toward said opening,
   (e) means to adjust the force of said spring means to vary said reduced pressure,
   (f) means to connect said inlet chamber to said inlet side of said main valve,
   (g) means to connect said outlet chamber to said outlet side of said main valve,
   (h) conduit means to connect said inlet chamber to said cover chamber in said main valve,
      said conduit means having a relatively large flow area so as to be able to conduct fluid at relatively high flow rates from said inlet chamber to said main-valve cover chamber,
   (i) a first valve mounted in said pilot valve body to control the flow of fluid from said inlet chamber through said conduit means to said main-valve cover chamber,
      said first valve having a relatively large flow area so as to cooperate with said conduit means in effecting a relatively high flow of fluid from said inlet chamber to said main-valve cover chamber,
   (j) a second valve mounted in said pilot valve body to control the flow of fluid from said main-valve cover chamber through said conduit means, and through said opening in said wall means, to said outlet chamber, and
   (k) means to effect operation of said first valve and said second valve by said pilot diaphragm, in such manner that when said pilot diaphragm is in a position relatively adjacent said opening said first valve is closed and said second valve is open whereby fluid flows out of said main-valve cover chamber to permit the upstream pressure at said inlet side to effect partial or complete opening of said main valve, and also in such manner that when said pilot diaphragm is in a position relatively remote from said opening said first valve is open and said second valve is closed whereby fluid from said inlet chamber passes through said conduit means to said main valve cover chamber at a rate that can be high so as to effect fast closing of said main valve, said pilot diaphragm on the side thereof relatively adjacent said opening in said wall means being exposed to a control pressure related to that of fluid that has passed through said main valve,
in which a hollow fitting is connected to the underside of said pilot valve body generally coaxially of said pilot diaphragm, said fitting having a large-diameter interior wall and forming part of said conduit means, in which said fitting has a valve seat on the upper end thereof, in which said first valve comprises a large poppet having a hollow tubular stem and also having a large head that seats on said seat, said head having a central hole communicating with said hollow steam, in which spring means are provided to bias said poppet head onto said seat, in which a valve guide is mounted in said opening in said wall means, coaxially of said fitting, said valve guide having a cylindrical passage that slidably receives said tubular poppet stem, and in which said second valve comprises a small poppet having an elongate stem that passes through said central hole and through the passage in said tubular stem and is connected to said pilot diaphragm, said small poppet having a head beneath said head of said large poppet, said stem of said small poppet being sufficiently long that said head of said small poppet is spaced from said head of said large poppet when said pilot diaphragm is in a position relatively close to said opening in said wall means, and sufficiently short that said head of said small poppet is seated on said head of said large poppet when said pilot diaphragm is in a position relatively remote from said opening.

14. A pilot-operated pressure-reducing valve system, which comprises:
   (a) a main valve having an inlet side, an outlet side, and means comprising a main-valve diaphragm and cover chamber to create a controlled reduced pressure of the fluid flowing out of said outlet side,
   (b) a pilot valve body,
      said body having an inlet chamber and an outlet chamber separated from each other by wall means having an opening therein,
   (c) a pilot diaphragm mounted on said pilot valve body,
   (d) pressure regulating spring means to bias said pilot diaphragm toward said opening,
   (e) means to adjust the force of said spring means to vary said reduced pressure,
   (f) means to connect said inlet chamber to said inlet side of said main valve,
   (g) means to connect said outlet chamber to said outlet side of said main valve,
   (h) conduit means to connect said inlet chamber to said cover chamber in said main valve,
      said conduit means having a relatively large flow area so as to be able to conduct fluid at relatively high flow rates from said inlet chamber to said main-valve cover chamber,
   (i) a first valve mounted in said pilot valve body to control the flow of fluid from said inlet chamber through said conduit means to said main-valve cover chamber,
      said first valve having a relatively large flow area so as to cooperate with said conduit means in effecting a relatively high flow of fluid from said inlet chamber to said main-valve cover chamber, (j) a second valve mounted in said pilot valve body to control the flow of fluid from said main-valve cover chamber through said conduit means, and through said opening in said wall means, to said outlet chamber, (k) means to effect operation of said first valve and said second valve by said pilot diaphragm, in such manner that when said pilot diaphragm is in a position relatively adjacent said opening said first valve is closed and said second valve is open whereby fluid flows out of said main-valve cover chamber to permit the upstream pressure at said inlet side to effect partial or complete opening of said main valve, and also in such manner that when said pilot diaphragm is in a position relatively remote from said opening said first valve is open and said second valve is closed whereby fluid from said inlet chamber passes through said conduit means to said main valve cover chamber at a rate that can be high so as to effect fast closing of said main valve, said pilot diaphragm on the side thereof relatively adjacent said opening in said wall means being exposed to a control pressure related to that of fluid that has passed through said main valve, and (l) an excess-flow shut off, said excess-flow shut off comprising valve means provided in said means to connect said outlet chamber to said outlet side of said main valve, said excess-flow shut off further comprising means to maintain said valve means open at all times when the flow in the main conduit in which said main valve is mounted is below a predetermined amount, and closed after the flow in said main conduit exceeds said predetermined amount, said excess-flow shut off further comprising small-area flow means provided in said pilot valve body to create a small flow of fluid in bypassing relationship to said first valve.

15. A pilot-operated pressure-reducing valve system, which comprises:

(a) a main valve having an inlet side, an outlet side, and means comprising a main-valve diaphragm and cover chamber to create a controlled reduced pressure of the fluid flowing out of said outlet side, (b) a pilot valve body, said body having an inlet chamber and an outlet chamber separated from each other by wall means having an opening therein, (c) a pilot diaphragm mounted on said pilot valve body, (d) pressure regulating spring means to bias said pilot diaphragm toward said opening, (e) means to adjust the force of said spring means to vary said reduced pressure, (f) means to connect said inlet chamber to said inlet side of said main valve, (g) means to connect said outlet chamber to said outlet side of said main valve, (h) conduit means to connect said inlet chamber to said cover chamber in said main valve, said conduit means having a relatively large flow area so as to be able to conduct fluid at relatively high flow rates from said inlet chamber to said main-valve cover chamber, (i) a first valve mounted in said pilot valve body to control the flow of fluid from said inlet chamber through said conduit means to said main-valve cover chamber, said first valve having a relatively large flow area so as to cooperate with said conduit means in effecting a relatively high flow of fluid from said inlet chamber to said main-valve cover chamber, (j) a second valve mounted in said pilot valve body to control the flow of fluid from said main-valve cover chamber through said conduit means, and through said opening in said wall means, to said outlet chamber, the flow area of said first valve being at least several times that of said second valve, and (k) means to effect operation of said first valve and said second valve by said pilot diaphragm, in such manner that when said pilot diaphragm is in a position relatively adjacent said opening said first valve is closed and said second valve is open whereby fluid flows out of said main-valve cover chamber to permit the upstream pressure at said inlet side to effect partial or complete opening of said main valve, and also in such manner that when said pilot diaphragm is in a position relatively remote from said opening said first valve is open and said second valve is closed whereby fluid from said inlet chamber passes through said conduit means to said main valve cover chamber at a rate that can be high so as to effect fast closing of said main valve, said pilot diaphragm on the side thereof relatively adjacent said opening in said wall means being exposed to a control pressure related to that of fluid that has passed through said main valve.

16. The invention as claimed in claim 15, in which the flow area of said first valve is at least five times that of said second valve.

17. A pilot-operated pressure-reducing valve system, which comprises:

(a) a main valve having an inlet side, an outlet side, and means comprising a main-valve diaphragm and cover chamber to create a controlled reduced pressure of the fluid flowing out of said outlet side, (b) a pilot valve body, said body having an inlet chamber and outlet chamber separated from each other by wall means having an opening therein, (c) a pilot diaphragm mounted on said pilot valve body, (d) pressure regulating spring means to bias said pilot diaphragm toward said opening, (e) means to adjust the force of said spring means to vary said reduced pressure, (f) means to connect said inlet chamber to said inlet side of said main valve, (g) means to connect said outlet chamber to said outlet side of said main valve, (h) conduit means to connect said inlet chamber to said cover chamber in said main valve, (i) a first poppet valve mounted in said pilot valve body, said first poppet valve being adapted to control the flow of fluid from said inlet chamber through said conduit means to said main-valve cover chamber, (j) a second poppet valve mounted in said pilot valve body, said second poppet valve being adapted to control the flow the fluid from said main-valve cover chamber through said conduit means, and through said opening in said wall means, to said outlet chamber, said second poppet valve being movable independently of said first poppet valve, and (k) means to effect operation of said first poppet valve and said second poppet valve by said pilot diaphragm, in such manner that when said pilot diaphragm is in a position relatively adjacent said opening said first poppet valve is closed and said second poppet valve is open whereby fluid flows out of said main-valve cover chamber to permit the upstream pressure at said inlet side to effect partial or complete opening of said main valve, and also in such manner that when said pilot diaphragm is in a position relatively remote from said opening said first poppet valve is open and said second poppet valve is closed whereby fluid from said inlet chamber passes through said conduit means to said main-valve cover chamber, said pilot diaphragm on the side thereof relatively adjacent said opening in said wall means being exposed to a control pressure.

18. A pilot-operated pressure-reducing valve system, which comprises:

(a) a main valve having an inlet side, an outlet side, and means comprising a main-valve diaphragm and cover chamber to create a controlled reduced pressure of the fluid flowing out of said outlet side, (b) a pilot valve body, said body having an inlet chamber and outlet chamber separated from each other by wall means having an opening therein, (c) a pilot diaphragm mounted on said pilot valve body, (d) pressure regulating spring means to bias said pilot diaphragm toward said opening, (e) means to adjust the force of said spring means to vary said reduced pressure, (f) means to connect said inlet chamber to said inlet side of said main valve, (g) means to connect said outlet chamber to said outlet side of said main valve, (h) conduit means to connect said inlet chamber to said cover chamber in said main valve, (i) a first poppet valve mounted in said pilot valve body, said first poppet valve being adapted to control the flow of fluid from said inlet chamber through said conduit means to said main-valve cover chamber, (j) a second poppet valve mounted in said pilot valve body, said second poppet valve being adapted to control the flow the fluid from said main-valve cover chamber through said conduit means, and through said opening in said wall means, to said outlet chamber, and (k) means to effect operation of said first poppet valve and said second poppet valve by said pilot diaphragm, in such manner that when said pilot diaphragm is in a position relatively adjacent said opening said first poppet valve is closed and said second poppet valve is open whereby fluid flows out of said main-valve cover chamber to permit the upstream pressure at said inlet side to effect partial or complete opening of said main valve, and also in such manner that when said pilot diaphragm is in a position relatively remote from said opening said first poppet valve is open and said second poppet valve is closed whereby fluid from said inlet chamber passes through said conduit means to said main-valve cover chamber, said pilot diaphragm on the side thereof relatively adjacent said opening in said wall means being exposed to a control pressure, the stem of the poppet of one of said poppet valves extending longitudinally through the stem of the poppet of the other of said poppet valves, said first-mentioned stem being connected to said pilot diaphragm for operation thereby, and the head of said poppet of one of said poppet valves seating on the head of said poppet of the other of said poppet valves when said diaphragm is in a position relatively remote from said opening.

19. The invention as claimed in claim 18, in which said other poppet valve has a flow passage in said stem thereof and in said head thereof and through which said stem passes, and in which said one poppet valve has its head adapted to seal said flow passage in response to movement of said pilot diaphragm away from said opening in said wall means.

20. A pilot-operated pressure-reducing valve system, which comprises:

(a) a main valve having an inlet side, an outlet side, and means comprising a main-valve diaphragm and cover chamber to create a controlled reduced pressure of the fluid flowing out of said outlet side, (b) a pilot valve body, said body having an inlet chamber and outlet chamber separated from each other by wall means having an opening therein, (c) a pilot diaphragm mounted on said pilot valve body, (d) pressure regulating spring means to bias said pilot diaphragm toward said opening, (e) means to adjust the force of said spring means to vary said reduced pressure, (f) means to connect said inlet chamber to said inlet side of said main valve, (g) means to connect said outlet chamber to said outlet side of said main valve, (h) conduit means to connect said inlet chamber to said cover chamber in said main valve, (i) a first poppet valve mounted in said pilot valve body, said first poppet valve being adapted to control the flow of fluid from said inlet chamber through said conduit means to said main-valve cover chamber, (j) a second poppet valve mounted in said pilot valve body, said second poppet valve being adapted to control the flow the fluid from said main-valve cover chamber through said conduit means, and through said opening in said wall means, to said outlet chamber, (k) means to effect operation of said first poppet valve and said second poppet valve by said pilot diaphragm, in such manner that when said pilot diaphragm is in a position relatively adjacent said opening said first poppet valve is closed and said second poppet valve is open whereby fluid flows out of said main-valve cover chamber to permit the upstream pressure at said inlet side to effect partial or complete opening of said main valve, and also in such manner that when said pilot diaphragm is in a position relatively remote from said opening said first poppet valve is open and said second poppet valve is closed whereby fluid from said inlet chamber passes through said conduit means to said main-valve cover chamber, said pilot diaphragm on the side thereof relatively adjacent said opening in said wall means being exposed to a control pressure, and (l) spring means provided in said pilot valve housing to bias the head of said first poppet valve toward the seat thereof.

21. A pilot valve for a pressure reducing valve system, said valve system including a main valve having an inlet side, an outlet side, and means comprising a main-valve diaphragm and cover chamber, and a valve closing spring, to create a controlled reduced pressure of the fluid flowing out of said outlet side, said pilot valve comprising:

(a) a pilot valve body, said body having an inlet chamber and an outlet chamber separated from each other by wall means having an opening therein, (b) a pilot diaphragm mounted on said pilot valve body, (c) a cover mounted on said pilot valve body over said pilot diaphragm and extending upwardly for a substantial distance, (d) a helical compression spring mounted in said cover and bearing downwardly on said pilot diaphragm to create a downward pressure thereon, (e) means to adjust the force of said spring to thus change the regulated pressure on the outlet side of said main valve, (f) first port means communicating with said inlet chamber for connection of said inlet chamber to said inlet side of said main valve, (g) second port means communicating with said outlet chamber for connection of said outlet chamber to said outlet side of said main valve, (h) third port means communicating with said inlet chamber for connection of said inlet chamber or said outlet chamber to said diaphragm chamber in said main valve, (i) valve-seat means mounted generally at said third port means and having a relatively large diameter valve seat at the upper end portion thereof, said valve seat being in a plane substantially parallel to that of said diaphragm, said valve seat means having a relatively large diameter opening beneath said valve seat and adapted to form at least part of large-area flow means extending to said main-valve diaphragm chamber, (j) a large poppet having an upwardly extending hollow tubular stem, and having at the lower end of said stem a large head that seats on said valve seat, said head having a central hole communicating with said stem, (k) spring means to bias said poppet head onto said seat, (l) a valve guide mounted in said opening in said wall means, coaxially of said valve seat means, said valve guide having a cylindrical passage that slidably receives said tubular poppet stem, (m) a small poppet having an elongate stem that passes through said central hole and through the passage in said tubular stem and is connected to said pilot diaphragm, said small poppet having a head beneath said head of said large poppet, said stem of said small poppet being sufficiently long that said head of said small poppet is spaced beneath said head of said large poppet when said pilot diaphragm is in a position relatively close to said opening in said wall means, said stem of said small poppet being sufficiently short that said head of said small poppet is seated on said head of said large poppet, and lifts said latter head off said seat, when said pilot diaphragm is in a position relatively remote from said opening, and (n) means to provide pressure on the underside of said pilot diaphragm that varies with the pressure of fluid that has passed through said main valve, whereby when said pressure on the underside of said pilot diaphragm is zero said head of said small poppet is spaced below said head of said large poppet and fluid may flow through said hole in said head of said large poppet and through said passage through said tubular stem to said outlet chamber, and whereby when pressure on the underside of said diaphragm is high said head of said small poppet is pulled upwardly by said pilot diaphragm and seats on said large head and closes said hole therein and also pulls said large head off of said valve seat for flow of fluid from said inlet chamber to said main-valve cover chamber, said last-named flow having a flow rate dependant upon the degree of elevation of the pressure beneath said pilot diaphragm, and whereby said head of said small poppet is seated on said head of said large poppet, and said head of said large poppet is also seated on said valve seat, throughout a range of pressures on the underside of said pilot diaphragm determined by the strength of said spring means biasing said large poppet head to seated condition.

22. The invention as claimed in claim 21, in which radial port means are provided in said tubular poppet at the upper end portion thereof and in communication with said outlet chamber.

* * * * *